US006114779A

United States Patent [19]

Nishionji et al.

[11] Patent Number: 6,114,779

[45] Date of Patent: Sep. 5, 2000

[54] SUB CONTROL PANEL FOR USE IN MAINTENANCE WORK, AND METHOD FOR MANIPULATING THE SUB CONTROL PANEL

[75] Inventors: Toshihiko Nishionji, Nagaokakyo; Tomiyasu Ueda, Yamanashi-ken; Masato Tanino, Kofu; Tadashi Tanno, Yamanashi-ken; Mikiya Nakata, Souraku-gun, all of Japan

[73] Assignee: Matsushita Electric Industrial Co., Ltd., Osaka-fu, Japan

[21] Appl. No.: 09/173,755

[22] Filed: Oct. 16, 1998

[30] Foreign Application Priority Data

Oct. 17, 1997 [JP] Japan .................................... 9-285443

[51] Int. Cl.$^{7}$ ........................................................ G06F 9/00

[52] U.S. Cl. ........................... 307/328; 307/326; 307/140

[58] Field of Search ............................... 192/130, 131 R; 200/42.01, 43.01, 43.16–43.21; 307/326, 328, 113, 115, 139, 140; 341/22, 24

[56] References Cited

U.S. PATENT DOCUMENTS 4,449,062 5/1984 Wilson .................................... 307/328
5,822,703 10/1998 Araki ........................................ 341/22

*Primary Examiner*—Fritz Fleming
*Attorney, Agent, or Firm*—Wenderoth, Lind & Ponack, L.L.P.

[57] ABSTRACT

A sub control panel for use in maintenance work has a control switch, enable switches and manipulation prohibition members. The sub control panel is configured such that the control switch is not activated unless the enable switches are being kept ON by one hand of the operator and the operator is prevented by the manipulation prohibition members from manipulating with the one hand from turning ON the enable switches. When the sub control panel is to be used, the operator must use both hands and is hindered from inserting both hands to a driven part of a machine to be subjected to maintenance work when the machine is operating.

15 Claims, 8 Drawing Sheets

SUB CONTROL PANEL FOR USE IN MAINTENANCE WORK, AND METHOD FOR MANIPULATING THE SUB CONTROL PANEL

BACKGROUND OF THE INVENTION

The present invention relates to a portable sub control panel for use in maintenance work which is portable used by an operator to operate a machine maintenance time. The sub control panel allowing the machine to be operated only when the operator manipulates the control panel, while refraining the machine from being operated unintentionally when the operator does not manipulate the panel, and a method for manipulating the sub control panel. The machine operated through the sub control panel is, for instance, an electronic component mounting apparatus for mounting electronic components on a circuit board, a solder paste printing apparatus printing, e.g., a solder paste onto the circuit board, or the like, production apparatus handling circuit boards, etc.

Referring to FIG. 8, conventionally for example in an electronic component mounting apparatus 1, the apparatus 1 comprises a main control panel 2 for controlling the operation of the mounting apparatus 1 in an usual production process and a sub control panel 3 branching from the main control panel 2. The sub control panel 3 is for maintenance work and is used in maintenance work by an operator to confirm a motion of the mounting apparatus 1 at a position near a maintenance point of the apparatus 1.

The above conventional sub control panel 3 for maintenance which is formed as shown in FIG. 9 drives a mechanical part of the mounting apparatus 1 corresponding to a control switch 4 manipulated by the operator only when the operator manipulates the control switch 4 arranged on the panel. That is, a plurality of control switches 4 are arranged on the panel and each of the control switches 4 is a self returning switch and drives the mechanical part corresponding to a control switch 4 manipulated by the operator only when the control switch 4 is depressed into an ON state by the operator, and then automatically is returned to an OFF state simultaneously when the depression by the operator is released, thereby stopping the operation of the mechanical part. The reason for the installation of the self returning control switch 4 is that when the operator hands are off the control switch 4 when carrying out the maintenance work to the mounting apparatus 1, the mounting apparatus 1 is forcibly brought in a non-operating state, whereby the operator's safety is secured.

However, in the conventional sub control panel 3 shown in FIG. 9, the operator can execute maintenance work to the interior of the mounting apparatus 1 with one hand while driving the mechanical part by depressing the control switch 4 with the other hand. The operator's safety is consequently not ensured absolutely, although safety countermeasures to the operator are demanded in the Western countries as well as Japan.

SUMMARY OF THE INVENTION

The present invention is devised with a view to the aforementioned point, and has for its object to provide a sub control panel for use in maintenance work and a method for manipulating the panel which enhance operator's safety at maintenance time.

In accomplishing these and other objects, according to the first aspect of the present invention, there is provided a sub control panel for use during maintenance work which is to be carried by an operator at the maintenance work for a machine to enable the operator to drive the machine in a vicinity of a position of the maintenance work, the sub control panel comprising:

a control switch set at one operation face which drives a driven part of the machine only when manipulated by one hand of the operator;

an enable switching device which brings the control switch into an operable state only when being kept ON by the other hand of the operator, and activates the driven part only when the control switch in the operable state is manipulated by the one hand; and a manipulation prohibition part which prohibits fingers of the other hand of the operator while turning ON the enable switch from manipulating the control switch.

According to the second aspect of the present invention, there is provided a method for manipulating a sub control panel for use in maintenance work, the sub control panel being carried by an operator performing the maintenance work for a machine to enable the operator to drive the machine in a vicinity of a position of the maintenance work, and including a control switch at an operation face which drives a driven part of the machine only when the sub control panel is held by one hand of the operator at a rear face confronting to the operation face and is manipulated by the operator, the method comprising:

turning ON an enable switch, thus bringing the control switch in an operable state and at the same time prohibiting the control switch from being manipulated by a finger of the one hand of the operator; and manipulating the control switch by the finger of the other hand of the operator only when the enable switch is kept ON.

According to the sub control panel of the first aspect of the present invention and the manipulation method for the sub control panel of the second aspect of the present invention, the control switch, enable switches and manipulation prohibition members are provided, so that the control switch is not activated unless the enable switches are in the ON state. Moreover the manipulation prohibition members prevent the operator's fingers of the other hand turning ON the enable switches from manipulating the control switch. Therefore, when the operator uses the sub control panel for the maintenance work, the operator is required to manipulate the control switch by one hand while manipulating the enable switches by the other hand, that is, the operator is inevitably required to use both hands. Thus, the operator cannot insert both hands into the driven part of the machine when the part is operating consequent to the use of the sub control panel. The operator's safety at the maintenance work is thus enhanced.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
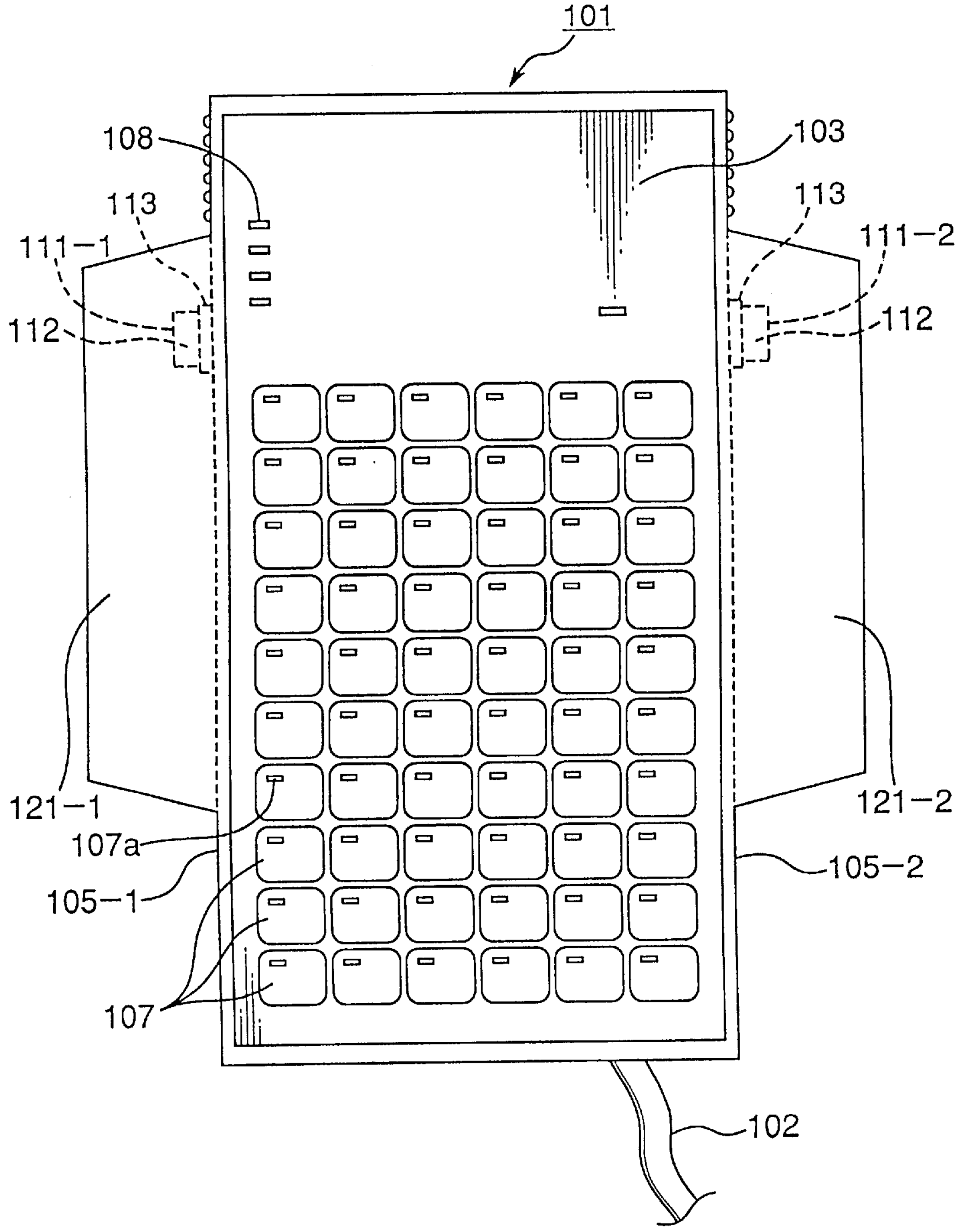
FIG. 1 is a plan view of a sub control panel for use in maintenance work according to an embodiment of the present invention.

A sub control panel for use in maintenance work and a method for manipulating the sub control panel according to preferred embodiments of the present invention will be described hereinbelow with reference to the drawings in which like parts are designated by like reference numerals. An electronic component mounting apparatus is exemplified as an embodiment of the "machine". An enable switch is exemplified as an embodiment of the "enable switching device". In the embodiments, the enable switching device comprises two enable switches or one enable switch. A manipulation prohibition member is exemplified as an embodiment of the "manipulation prohibition part". In the embodiments, the manipulation prohibition part comprises two manipulation prohibition members or one manipulation prohibition member.

Figure 4:
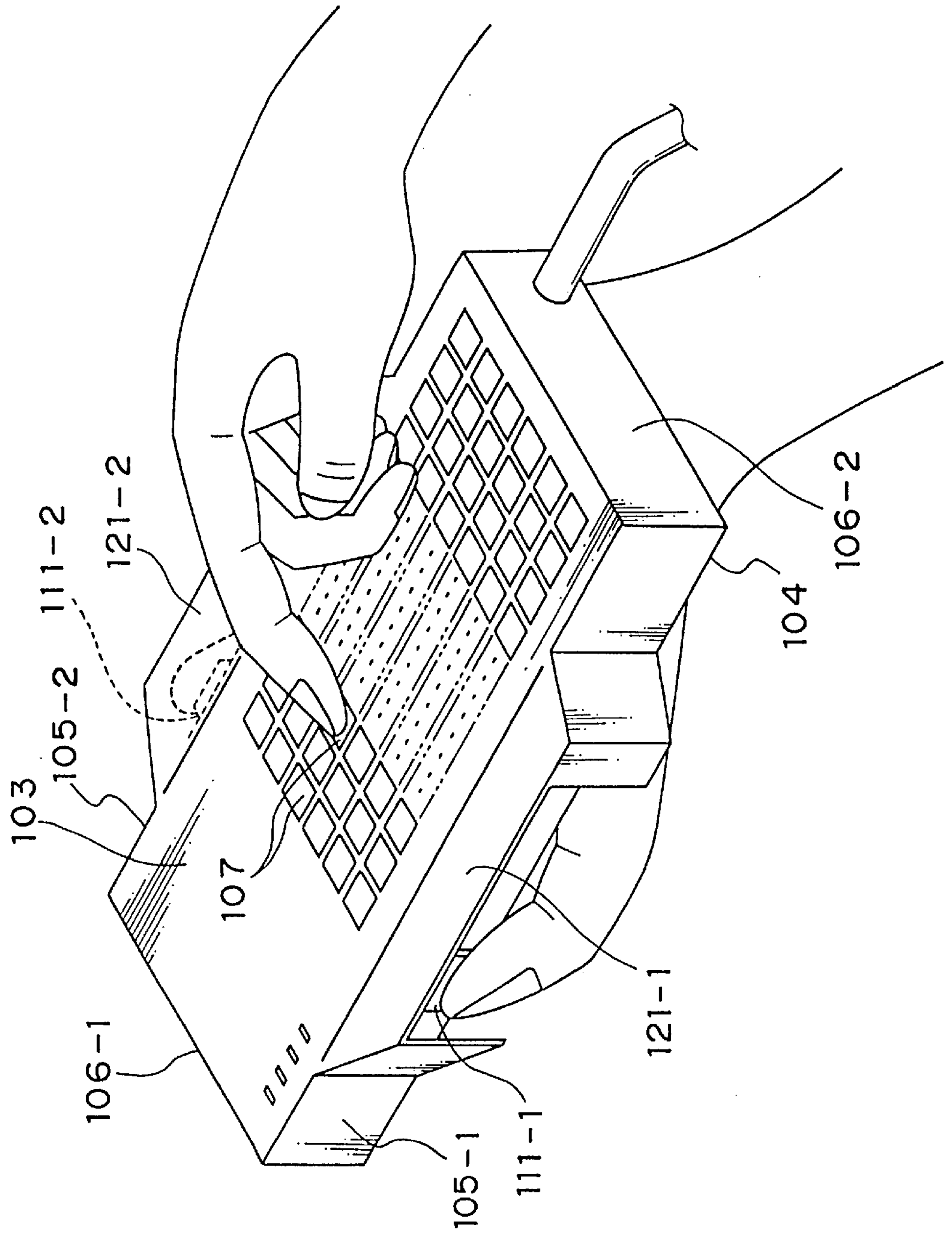
FIG. 4 is a perspective view of the sub control panel for use in maintenance work of FIG. 1 in a state used by the operator.
Figure 8:
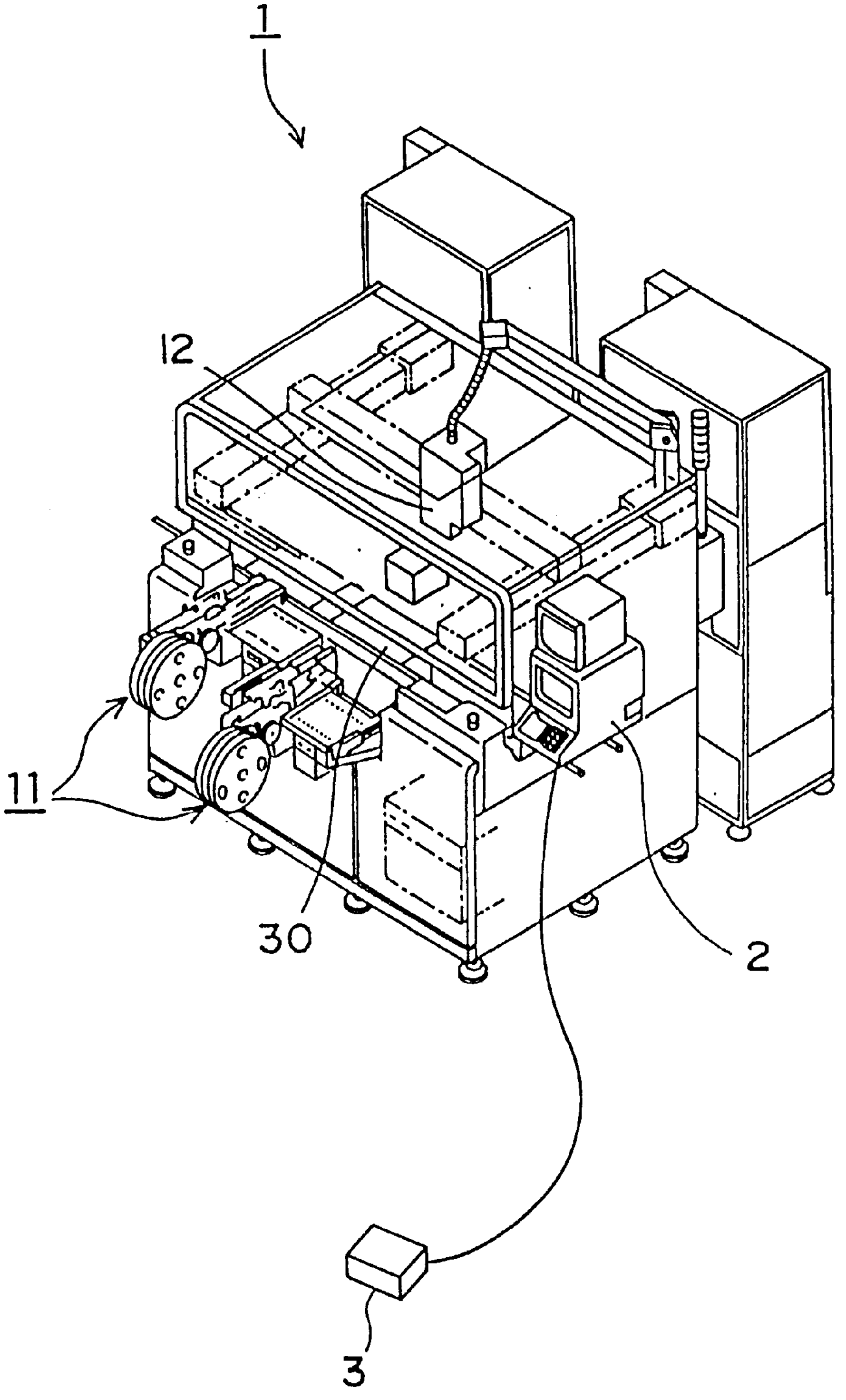
Fig. 8 PRIOR ART
FIG. 8 is a perspective view of an electronic component mounting apparatus and a sub control panel in a conventional form.
Figure 9:
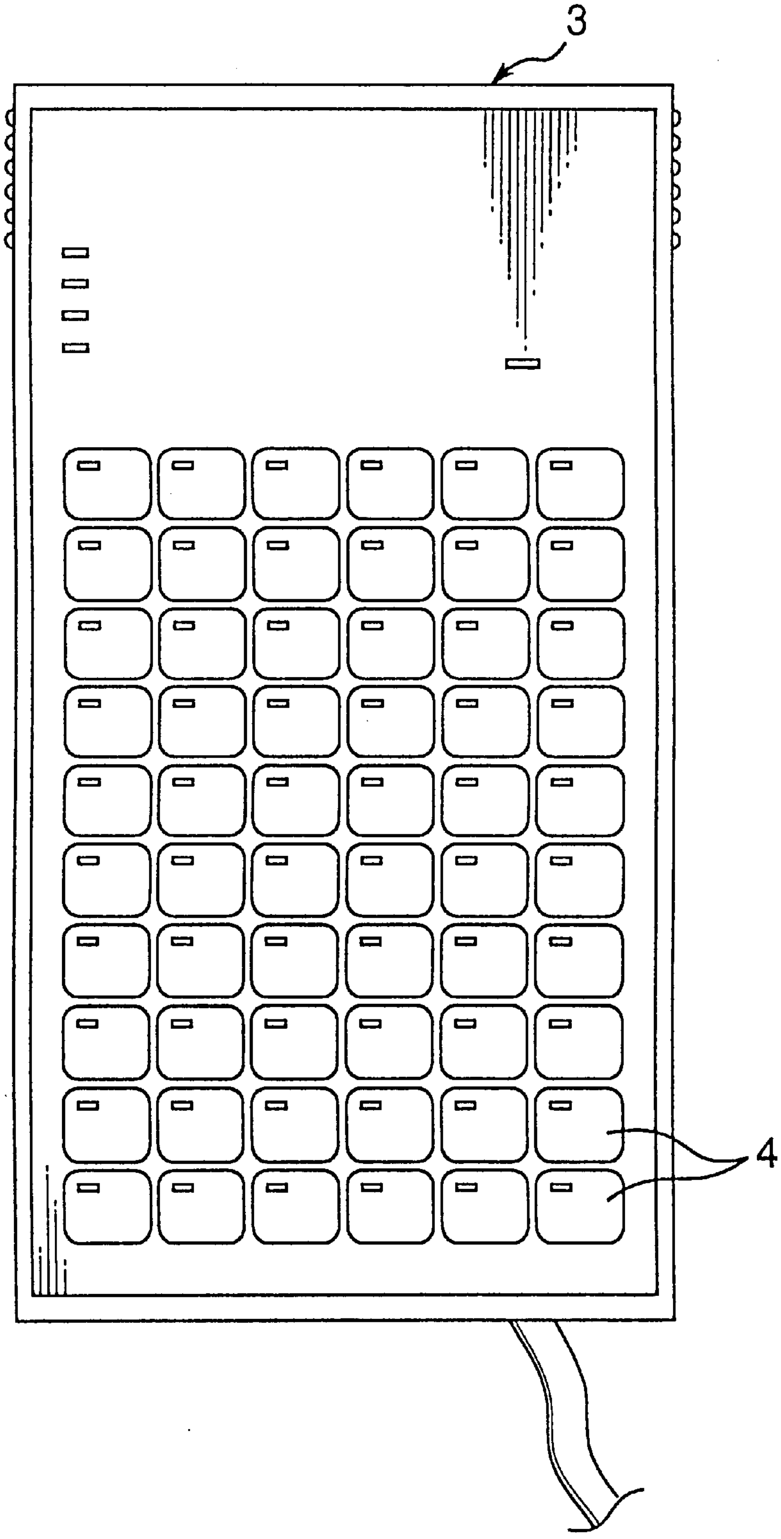
Fig.9 PRIOR ART
FIG. 9 is a plan view of the conventional sub control panel.

FIG. 1 indicates a sub control panel 101 for use in maintenance work according to the embodiment. Similar to the conventional art shown in FIG. 8, the sub control panel 101 is connected to a main control panel 2 of an electronic component mounting apparatus 1 via a cable 102. The sub control panel 101 is formed in a shape and a size enabling an operator to carry it, in place of the main control panel 2, so that the operator can drive a driven part of the electronic component mounting apparatus 1 in the vicinity of a maintenance point while operating the sub control panel. As shown in FIG. 4, the sub control panel 101 has an operation face 103, a rear face 104 opposite to the operation face 103, two hold side faces 105-1, 105-2 confronting each other and orthogonal to the operation face 103 and rear face 104 with having enable switches 111-1, 111-2 to be described later fitted thereat, and two confronting side faces 106-1, 106-2 orthogonal to the operation face 103 and rear face 104 and also orthogonal to the hold side faces 105-1, 105-2, so that the sub control panel 101 is schematically in a rectangular parallelepiped shape.

A control switch 107 of, so called, a touch panel type is set at the operation face 103, which drives the driven part of the electronic component mounting apparatus 1 only when it is manipulated, more specifically only when being depressed by one hand of the operator, e.g., right hand.

A plurality of control switches 107 may be formed in a matrix as the illustrated sub control panel 101. In this case, if a plurality of control switches 107 are depressed at the same time, a plurality of driven parts corresponding to the depressed control switches 107 can be activated simultaneously. In order to simplify a description of the preferred embodiments of the present invention, a case that one control switch 107 is formed at the operation face 103 is employed in the following explanation as an example.

The control switch 107 is turned ON only when it is being pressed down, thereby driving the driven part of the mounting apparatus 1 which corresponds to the depressed control switch 107, and is automatically turned OFF when the depressing is released, thereby bringing the driven part in an inoperative state. A display lamp **107*a* of the control switch 107 indicates the ON state of the control switch 107**.

As a concrete example of the control switch 107 of the sub control panel 101 for the electronic component mounting apparatus 1, there is a switch for "rotating a head", or a switch for "selecting a nozzle", etc. When the "head rotation" switch is pressed down, a head having a plurality of suction nozzles which suck and hold electronic components from an electronic component feeding apparatus 11 of FIG. 8 and mount them to a circuit board 30, is rotated. When the "nozzle selection" switch is pressed, a selecting operation of the suction nozzle to suck the electronic component is executed. In the case where the above "machine" is a printing apparatus printing a wiring pattern on a circuit board or printing a solder paste with the use of a mask having a pattern corresponding to electrode parts on the wiring pattern, a switch for "moving a squeegee" or the like is provided as the control switch at the sub control panel, and the squeegee can be moved by depressing the "squeegee movement" switch.

Figure 2:
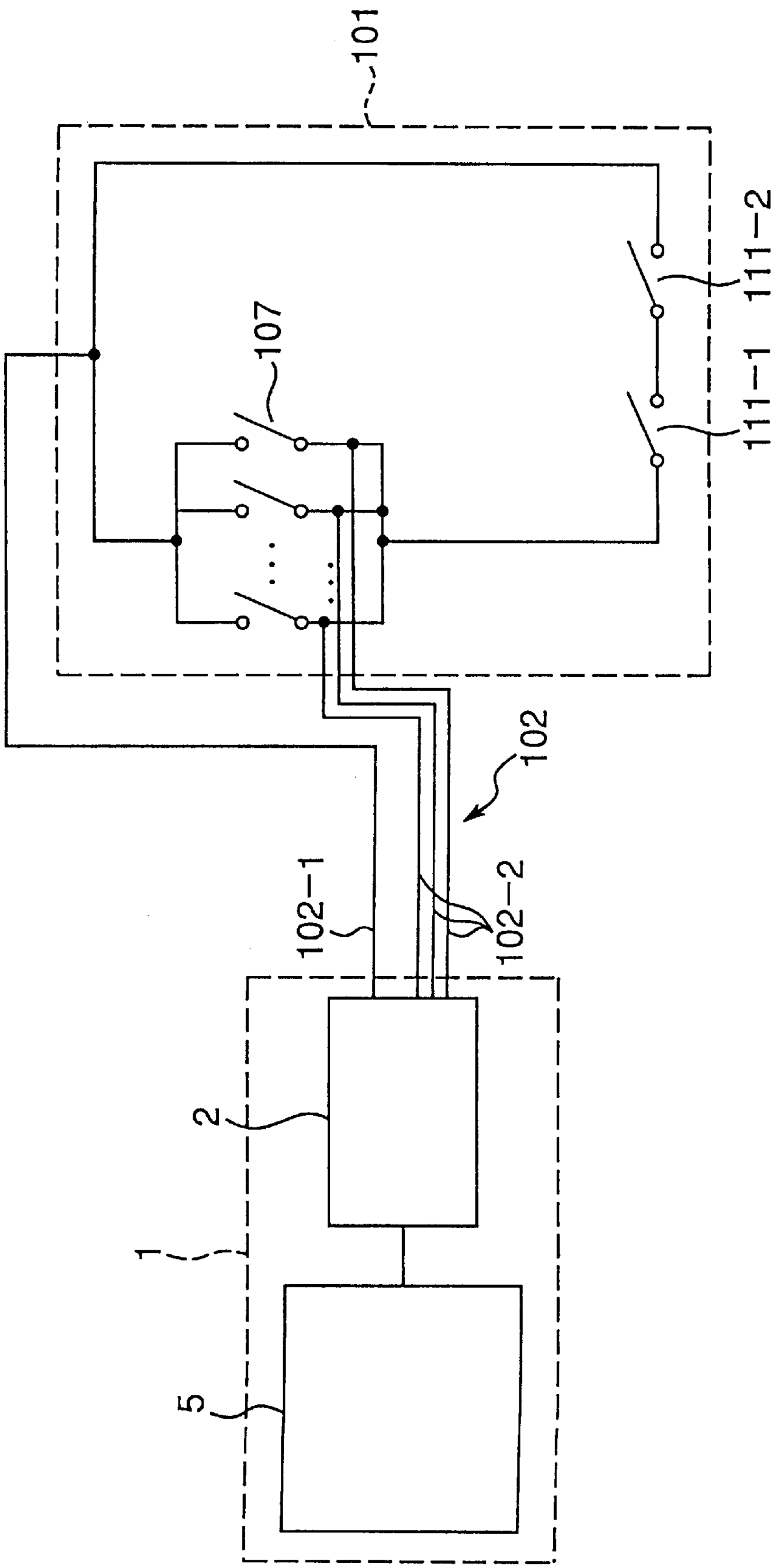
FIG. 2 is a circuit diagram of the sub control panel for use in maintenance work shown in FIG. 1.

A display lamp 108 indicating the presence/absence of power being supplied to the sub control panel 101 from the main control panel 2 via a cable 102-1 as shown in FIG. 2, a display lamp 108 indicating the fact that the circuit board 30 is being transferred, and so on, are also arranged on the operation face 103.

The enable switch 111-1 is fitted at the hold side face 105-1 and the enable switch 111-2 is fitted at the hold side face 105-2. The enable switches 111-1, 111-2 are turned ON only when depressed by fingers of the other hand of the operator, e.g., left hand. The control switch 107 is brought into an operable state solely when both of the enable switches 111-1, 111-2 are in the ON state at the same time. The enable switches 111-1, 111-2 are turned ON only when the operator depresses the switches. When the operator releases the depression, the enable switches 111-1, 111-2 automatically return to an original OFF state promptly because of springs set in the enable switches 111-1, 111-2.

Figure 3:
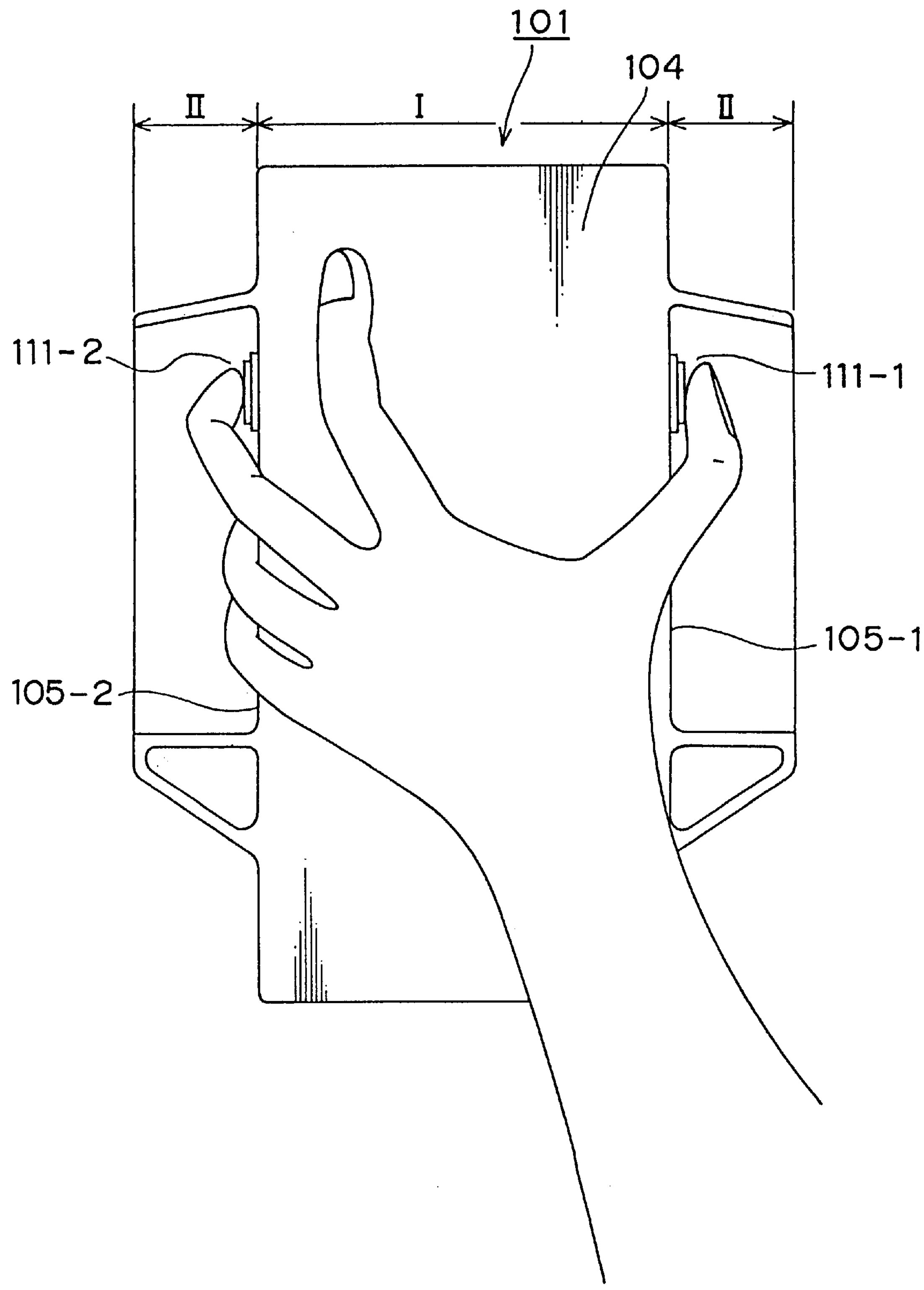
FIG. 3 is a diagram of the sub control panel for use in maintenance work of FIG. 1 seen from a rear face when held by an operator.

A distance between the hold side faces 105-1 and 105-2 where the enable switches 111-1, 111-2 are fitted, that is, a size I in FIG. 3 is set so that while at least the operator's left palm is in touch with the rear face 104 thereby supporting the sub control panel 101, the operator can manipulate the enable switch 111-1 by the thumb and the enable switch 111-2 by the remaining one or plural fingers of the left hand. In the present embodiment, the above size I is 100 mm. Since the size I is determined with reference to an average size of human hands using the sub control panel 101, the size is made different between, for example, Japanese and Western people.

Each of the enable switches 111-1, 111-2 has a depression button 112 to be depressed by the operator as above. In order to arrange the enable switches 111-1, 111-2 to the hold side faces 105-1, 105-2, an installation opening is formed in each hold side face 105-1, 105-2, to which the above depression button 112 is inserted and fitted movably through the installation opening. However, if a gap is present between an inner face of the installation opening and an outer face of the depression button 112, an article can be caught in the gap in a state with the depression button 112 depressed, whereby the depressed state of the depression button 112 is maintained even if the operator releases the depression. Thus, in order to avoid unintentionally or intentionally making the above state keep on depressing the depression button 112, according to the present embodiment, the gap is filled so as to prevent the article from being caught in the gap, and moreover, each of the enable switches 111-1, 111-2 has a depression retention preventing member 113. The depression retention preventing member 113 is a member which allows the depression button 112 to slide and prevents the depression button 112 from being kept depressed when it is released.

The enable switches 111-1, 111-2 are set to project from the hold side faces 105-1, 105-2 in the embodiment. However, the enable switches are not limited to the type, and can be fitted, for example, inside recesses formed into the sub control panel 101 deeper than the side faces 105-1, 105-2.

In the sub control panel 101 of the embodiment, a flange-shaped manipulation prohibition member 121-1 is also formed at the hold side face 105-1 and a flange-shaped manipulation prohibition member 121-2 is also formed at the hold side face 105-2. The manipulation prohibition members (flanges) 121-1, 121-2 are obtained by extending the operation face 103 in a breadthwise direction of the sub control panel 101 having the hold side faces 105-1, 105-2 and extending approximately along the operation face 103. The manipulation prohibition members (flanges) 121-1, 121-2 prevent the fingers of the left hand of the operator pressing ON the enable switches 111-1, 111-2 from turning to the operation face 103 and manipulating the control switch 107. Although only a part of the operation face 103 is extended in the present embodiment as indicated in the drawings, the invention is not restricted to this, for example, the prohibition member may be formed at each hold side face 105-1, 105-2 by extending the operation face 103 all over the face. Alternatively, the above manipulation prohibition members 121-1, 121-2 may be erected at the hold side face 105-1, 105-2 respectively without extending the operation face 103.

A breadthwise size II indicated in FIG. 3 of each of the manipulation prohibition members 121-1, 121-2 is 30 mm in the embodiment.

As shown in the drawings, the enable switches 111-1, 111-2 are arranged at the hold side faces 105-1, 105-2 to face each other in the present embodiment. Arrangement positions of the enable switches are optional at the hold side faces 105-1, 105-2 within areas that the manipulation prohibition members can be provided.

The operation of and the method for manipulating the sub control panel 101 constituted as above will be described below.

Before starting maintenance work of the electronic component mounting apparatus 1, the operator connects the cable 102 to a connector part of the main control panel 2. In consequence, a driven part 5 of the electronic component mounting apparatus 1 is rendered movable at the time of the maintenance work through the sub control panel 101 in place of the main control panel 2.

As illustrated in FIGS. 3 and 4, the operator supports the rear face 104 of the sub control panel 101, for instance, by the palm and finger(s) of the left hand, and at the same time depresses one enable switch 111-1 by the thumb and the other enable switch 111-2 by the remaining one finger, e.g., middle finger or plural fingers. At this time, it is impossible because of the presence of the manipulation prohibition members 121-1, 121-2 corresponding to the enable switches 111-1, 111-2 for the fingers pressing the enable switches 111-1, 111-2 into the ON state and the other fingers to read the operation face 103 to press the control switch 107. Also, as both of the enable switches 111-1, 111-2 are pressed down and turned ON simultaneously, the control switch 107 is brought into the operable state.

In the above state, the operator presses the control switch 107 corresponding to the driven part 5 to be driven in the electronic component mounting apparatus 1 by the right hand of the operator, as shown in FIG. 4.

Referring to FIG. 2, both enable switches 111-1, 111-2 and the required control switch 107 are closed through the above-described pressing operation, and a signal is transmitted to the main control panel 2 via the connected control switch 107 and a cable 102-2, so that the corresponding driven part 5 in the electronic component counting apparatus 1 is activated.

After it is confirmed whether or not the driven part 5 operates properly or after the driven part 5 finishes a predetermined operation, the operator detaches at least one hand from the sub control panel 101 and then carries out the maintenance work of the electronic component counting apparatus 1.

As described hereinabove, according to the sub control panel 101 of the present embodiment, enable switches 111-1, 111-2 are fitted at confronting side faces 105-1, 105-2 respectively, and moreover manipulation prohibition members 121-1, 121-2 are formed to prevent the control switch 107 of the operation face 103 from being manipulated by the finger or fingers of the operator's left hand in a state where the enable switches 111-1, 111-2 are simultaneously kept ON by the left hand. Therefore, according to the sub control panel 101 of the present embodiment, the operator's left hand cannot be used except for supporting the sub control panel 101 and turning ON both of the enable switches 111-1, 111-2 at the same time. Further, the control switch 107 at the operation face 103 is never brought in the operable state unless the enable switches 111-1, 111-2 are turned ON simultaneously. Thus, the operator cannot help using the other (right) hand in order to manipulate the control switch 107 to drive the driven part of the electronic component mounting apparatus 1 for confirming an operation of the driven part that is the subject of the maintenance work. In other words, the operator inevitably uses both hands so as to manipulate the sub control panel 101 of the embodiment to drive the driven part of the electronic component mounting apparatus 1. If the operator detaches the right or left hand from the sub control panel 101, the driven part of the electronic component mounting apparatus 1 is stopped.

Accordingly, with the employment of the sub control panel 101 of the present embodiment, the operator cannot insert both hands into the electronic component mounting apparatus 1 to perform maintenance work when the driven part of the electronic component mounting apparatus 1 is operating. The operator's safety during the maintenance work is thus secured.

Figure 5:
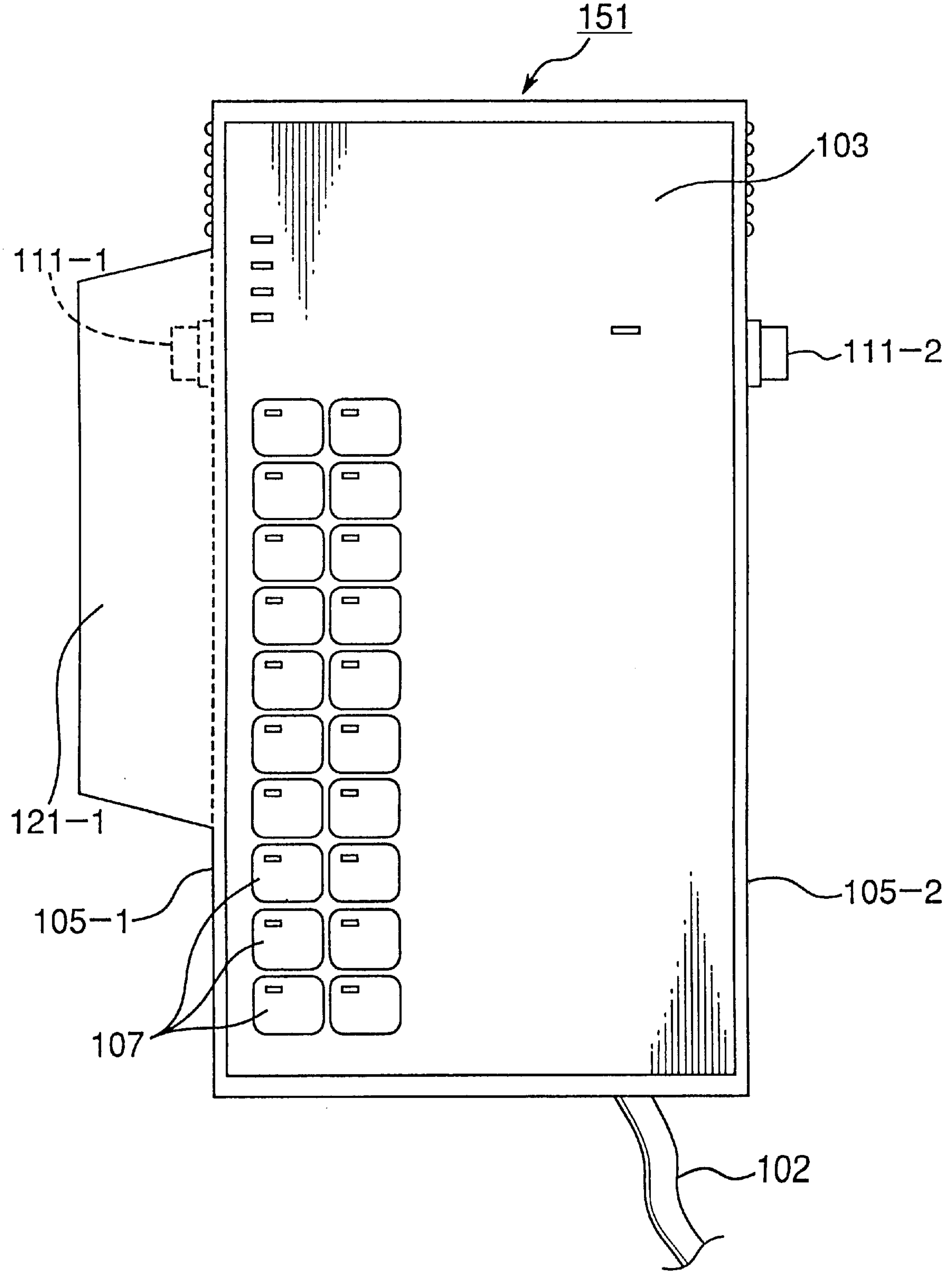
FIG. 5 is a plan view of a modified example of the sub control panel of FIG. 1.

Although two manipulation prohibition members 121-1, 121-2 are formed to the above-described sub control panel 101, the present invention is not limited to this. For example, only one manipulation prohibition member 121-1 may be provided as in a sub control panel 151 indicated in FIG. 5. However, it is possible in this case that the fingers pressing the enable switches 111-1, 111-2 can turn to the operation face 103 from the side of the hold side face 105-2 not having the manipulation prohibition member, and therefore consideration should be taken, for example, not to arrange the control switch 107 at an edge part adjoining the hold side face 105-2 of the operation face 103.

Figure 6:
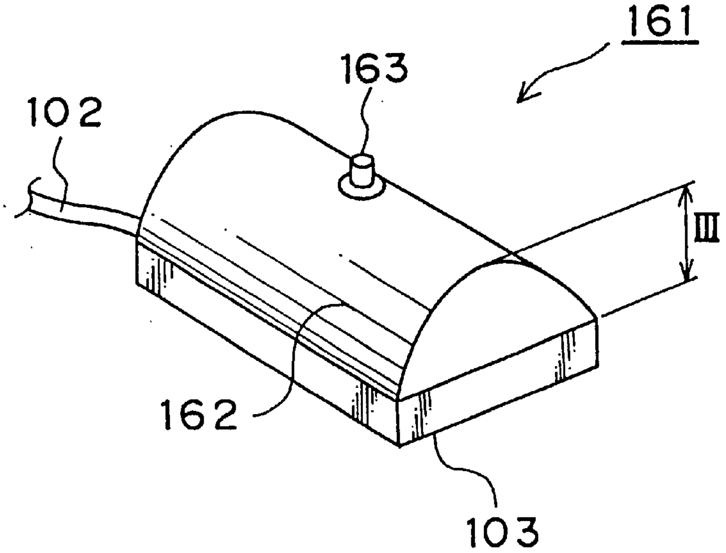
FIG. 6 is a perspective view of another modified example of the sub control panel of FIG. 1.
Figure 7:
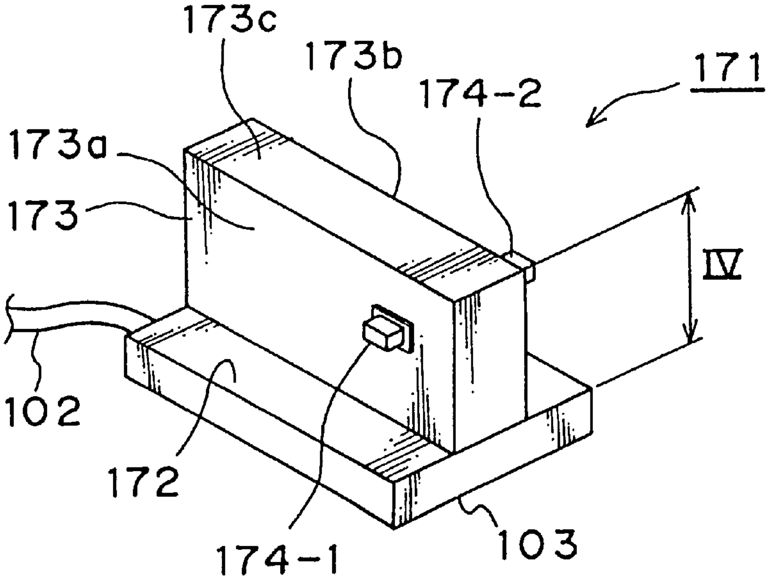
FIG. 7 is a perspective view of a further different modified example of the sub control panel of FIG. 1.

FIGS. 6 and 7 represent modified examples of the above sub control panel 101. According to a sub control panel 161 shown in FIG. 6 and made clear from FIG. 6, a rear face 162 faced to the operation face 103 is shaped like an archform projecting opposite to the operation face 103, thereby eliminating the manipulation prohibition members 121-1, 121-2 which are formed, e.g., by extending the operation face 103 of the sub control panel 101. The operator touches a top part of the rear face 162 by the left palm and holds the vicinity of the rear face 162, thereby supporting the sub control panel 161. If a heightwise size III of the rear face 162 is determined so that the fingers of the left hand cannot turn to the operation face 103 when holding the rear face 162, the rear face 162 works also as the manipulation prohibition member, whereby the flange-like manipulation prohibition members of the sub control panel 101 are eliminated. In addition, if an enable switch 163 is arranged, e.g., at the top part of the rear face 162, the operator can press down the enable switch 163 by the palm when holding the rear face 162, and therefore one enable switch becomes enough.

In the above sub control panel 161 as well, the operator holds the rear face 162 while depressing the enable switch 163, e.g., by the left hand and manipulates the control switch 107 at the operation face 103 by the right hand. Thus, similar to the case of the sub control panel 101, the operator using the sub control panel 161 cannot insert the both hands into the machine when the driven part of the machine is operating, so that the operator's safety is secured.

A sub control panel 171 of FIG. 7 is similar to the sub control panel 161, not having the manipulation prohibition members 121-1, 121-2 which are obtained, for instance, by extending the operation face 103 as in the sub control panel 101. As indicated in the drawing, a plate-like member (flange) 173 projects in a direction opposite to the operation face 103 at a rear face 172 confronting the operation face 103. The operator holds the plate-like member (flange) 173, for example, by the left hand and supports the sub control panel 171. Since a heightwise size IV of the plate-like member (flange) 173 of the sub control panel 171 is determined so that fingers of the operator's left hand cannot turn to the operation face 103 when holding the plate-like member 173, the plate-like member (flange) 173 functions as the manipulation prohibition member, and consequently the flange-like manipulation prohibition members of the sub control panel 101 are eliminated. Enable switches 174-1, 174-2, similar to the above-described ones, are set at hold side faces 173*a*, 173*b* of the plate-like member 173 facing each other. So, the operator is required to press both enable switches 174-1, 174-2 at one time, simultaneously, when holding the plate-like member (flange) 173. If the enable switch is disposed at a side face 173*c* of the plate-like member (flange) 173 in touch with the operator's palm, the enable switch at the side face 173c can be depressed by the palm when the operator holds the plate-like member (flange) 173 by the operator's hand and accordingly only one enable switch can be provided at the side face 173*c*. In this case, the enable switch should be placed in a recess formed in the side face 173*c* to prevent the switch from being turned ON when the sub control panel 171 is loaded in a state with the side face 173*c* kept in touch with a plate-like body, or the like measurements should be taken into consideration.

Also in the sub control panel 171, the operator holds the plate-like member (flange) 173 while depressing the enable switches 174-1, 174-2, e.g., by the left hand and manipulates the control switch 107 of the operation face 103 by the right hand. Similar to when the sub control panel 101 is used, when the sub control panel 171 is used, the operator cannot insert both hands into the machine during the operation of the driven part of the machine, and the operator's safety at the work is secured.

In any of the sub control panels 101, 151, 161 and 171, the enable switches are not set at the operation face 103. The sub control panel may be formed in a configuration, e.g., that the control switch 107 and enable switches are arranged separately on the same operation face via a distance and, a diaphragm separating the control switch 107 and enable switches is disposed at a boundary part on the operation face as the above-mentioned manipulation prohibition member.

The entire disclosure of Japanese Patent Application No. 9,285 443 filed on Oct. 17, 1997, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A sub control panel for use by an operator of a machine to enable the operator to drive the machine, the sub control panel comprising:

a control switch located on an operation face, said control switch being operable to drive a driven part of the machine only when being maintained in an ON position by one hand of the operator;

an enable switching device which brings said control switch into an operable state only when being maintained in an ON position by the other hand of the operator; and a manipulation prohibition flange which prohibits the other hand of the operator from keeping said control switch in the ON position while the other hand is keeping said enable switching device in the ON position.

2. A sub control panel according to claim 1, wherein the sub control panel is formed in an approximately rectangular parallelepiped shape having the operation face, the sub control panel further comprising:

a rear face opposite to the operation face, and two opposite hold side faces which are orthogonal to the operation face and the rear face, wherein the rear face is to be held by the other hand of the operator;

said enable switching device comprises two enable switches, wherein each of said two enable switches is located on a respective one of the two opposite hold side faces; and said manipulation prohibition flange comprises two manipulation prohibition members, each of said two manipulation prohibition members being set upright at one of the two opposite hold side faces so as to be elongated from the two opposite hold side faces to prevent fingers of the other hand from reaching the operation face.

3. A sub control panel according to claim 2, wherein said two enable switches comprise:

depression buttons inserted movably through installation openings formed in the two opposite hold side faces; and depression retention prevention members operable to fill gaps between each of said depression buttons and a respective one of said installation openings, wherein said depression retention prevention members are further operable to allow each of said depression buttons to slide when depressed and to prevent said depression buttons from continuing to be depressed after being released by the operator.

4. A sub control panel according to claim 2, wherein said two enable switches are operable to turn ON only when depressed, and operable to automatically turn OFF when not depressed.

5. A sub control panel according to claim 4, wherein said two enable switches comprise:

depression buttons inserted movably through installation openings formed in the two opposite hold side faces; and depression retention prevention members operable to fill gaps between each of said depression buttons and a respective one of said installation openings, wherein said depression retention prevention members are further operable to allow each of said depression buttons to slide when depressed and to prevent said depression buttons from continuing to be depressed after being released by the operator.

6. A sub control panel according to claim 2, wherein a distance between the two opposite hold side faces is set such that at least a palm of the other hand is in contact with the rear face to support the sub control panel, a thumb of the other hand can manipulate one of said two enable switches and at least one of the remaining fingers of the other hand can manipulate the other of said two enable switches.

7. A sub control panel according to claim 6, wherein said two enable switches are operable to turn ON only when depressed, and operable to automatically turn OFF when not depressed.

8. A sub control panel according to claim 7, wherein said two enable switches comprise:

depression buttons inserted movably through installation openings formed in the two opposite hold side faces; and depression retention prevention members operable to fill gaps between each of said depression buttons and a respective one of said installation openings, wherein said depression retention prevention members are further operable to allow each of said depression buttons to slide when depressed and to prevent said depression buttons from continuing to be depressed after being released by the operator.

9. A sub control panel according to claim 6, wherein said two enable switches comprise:

depression buttons inserted movably through installation openings formed in the two opposite hold side faces; and depression retention prevention members operable to fill gaps between each of said depression buttons and a respective one of said installation openings, wherein said depression retention prevention members are further operable to allow each of said depression buttons to slide when depressed and to prevent said depression buttons from continuing to be depressed after being released by the operator.

10. A sub control panel as claimed in claim 6, wherein the machine comprises an electronic component mounting apparatus for mounting electronic components to a circuit board.

11. A sub control panel as claimed in claim 6, wherein the machine comprises a printing apparatus for printing a pattern on a circuit board.

12. A sub control panel according to claim 1, wherein the sub control panel is formed in an approximately rectangular parallelepiped shape having the operation face, the sub control panel further comprising:

a rear face opposite to the operation face, and two opposite hold side faces which are orthogonal to the operation face and the rear face, wherein said manipulation prohibition flange projects from the rear face in a direction opposite to the operation face, said enable switching device being located on said manipulation prohibition flange.

13. A sub control panel according to claim 1, wherein the sub control panel is formed in an approximately rectangular parallelepiped shape having the operation face, the sub control panel further comprising a rear face opposite to the operation face, wherein the rear face is arch-like, projecting in a direction opposite to the operation face, thereby also forming the manipulation prohibition flange, said enable switching device being located on the rear face.

14. A sub control panel according to claim 13, wherein said enable switching device comprises one enable switch operable to turn ON only when depressed, and operable to automatically turn OFF when not depressed.

15. A method for manipulating a sub control panel for use by an operator of a machine to enable the operator to drive the machine, wherein the sub control panel includes a control switch located on an operation face, the control switch being operable to drive a driven part of the machine only when the sub control panel is held by one hand of the operator at a rear face located opposite to the operation face and the control switch is maintained in an ON position by the operator, the method comprising:

turning ON an enable switch, thus bringing the control switch into an operable state and at the same time, prohibiting the control switch from being maintained in the ON position by the one hand of the operator with a manipulation prohibition flange; and turning ON the control switch with the other hand of the operator only when the enable switch is ON.

* * * * *